United States Patent
Koh et al.

(10) Patent No.: US 11,022,458 B2
(45) Date of Patent: Jun. 1, 2021

(54) NAVIGATION SYSTEM WITH ROADWAY LANE GUIDANCE MECHANISM AND METHOD OF OPERATION THEREOF

(71) Applicant: TeleNav, Inc., Santa Clara, CA (US)

(72) Inventors: Kok Wei Koh, Mountain View, CA (US); Eric Wood, Menlo Park, CA (US)

(73) Assignee: Telenav, Inc., Santa Clara, CA (US)

( * ) Notice: Subject to any disclaimer, the term of this patent is extended or adjusted under 35 U.S.C. 154(b) by 0 days.

(21) Appl. No.: 16/725,353

(22) Filed: Dec. 23, 2019

(65) Prior Publication Data

US 2020/0217686 A1 Jul. 9, 2020

Related U.S. Application Data

(60) Provisional application No. 62/788,638, filed on Jan. 4, 2019.

(51) Int. Cl.
| | | |
|---|---|---|
| *G01C 21/36* | (2006.01) | |
| *G08G 1/0968* | (2006.01) | |
| *G08G 1/087* | (2006.01) | |
| *G08G 1/04* | (2006.01) | |

(52) U.S. Cl.
CPC ..... *G01C 21/3658* (2013.01); *G01C 21/3602* (2013.01); *G08G 1/04* (2013.01); *G08G 1/087* (2013.01); *G08G 1/096855* (2013.01)

(58) Field of Classification Search
CPC .. G01C 21/3658; G01C 21/3602; G08G 1/04; G08G 1/087; G08G 1/096855

USPC .......................................................... 340/906
See application file for complete search history.

(56) References Cited

U.S. PATENT DOCUMENTS

| | | | |
|---|---|---|---|
| 8,384,532 B2 | 2/2013 | Szczerba et al. | |
| 8,629,903 B2 | 1/2014 | Seder et al. | |
| 9,008,961 B2* | 4/2015 | Nemec | B60T 7/22 |
| | | | 701/430 |
| 9,047,703 B2 | 6/2015 | Beckwith et al. | |
| 9,412,273 B2* | 8/2016 | Ricci | B60R 16/0373 |
| 9,709,406 B2* | 7/2017 | Bastiaensen | G01C 21/26 |
| 9,988,047 B2* | 6/2018 | Johnson | B60W 10/184 |
| 10,527,445 B2* | 1/2020 | Tertoolen | G01S 19/42 |
| 10,564,001 B2* | 2/2020 | Wood | G01C 21/3673 |
| 2007/0050134 A1* | 3/2007 | Hayashida | G01C 21/3658 |
| | | | 701/414 |
| 2010/0253593 A1 | 10/2010 | Seder et al. | |
| 2010/0253598 A1 | 10/2010 | Szczerba et al. | |
| 2014/0267263 A1 | 9/2014 | Beckwith et al. | |
| 2017/0183035 A1* | 6/2017 | Patana | B62D 15/025 |
| 2019/0355247 A1 | 11/2019 | Aist et al. | |
| 2019/0355250 A1 | 11/2019 | Kuffner, Jr. | |

* cited by examiner

*Primary Examiner* — John A Tweel, Jr.
(74) *Attorney, Agent, or Firm* — Perspectives Law Group, Corp.

(57) ABSTRACT

A navigation system includes: a control unit; a communication unit, coupled to the control unit, configured to determine a lane position on a current roadway for a free-drive mode; identify a restricted use lane based on a distance and the lane position ahead on the current roadways; and determine a roadway lane along with the restricted use lane and the lane position for displaying on a device.

20 Claims, 8 Drawing Sheets

NAVIGATION SYSTEM WITH ROADWAY LANE GUIDANCE MECHANISM AND METHOD OF OPERATION THEREOF

CROSS REFERENCE TO RELATED APPLICATION(S)

This application claims the benefit of U.S. Provisional Patent Application Ser. No. 62/788,638 filed Jan. 4, 2019, and the subject matter thereof is incorporated herein by reference thereto.

TECHNICAL FIELD

An embodiment of the present invention relates generally to a navigation system, and more particularly to a system for roadway lane guidance.

BACKGROUND

Modern consumer and industrial electronics, especially devices such as graphical navigation systems, cellular phones, and vehicle integrated navigation and computing systems, are providing increasing levels of functionality to support modern life, including navigation and route guidance services. Research and development in the existing technologies can take a myriad of different directions.

As users become more empowered with the growth of navigation devices and vehicle based navigation services, new and old paradigms begin to take advantage of this new device space. There are many technological solutions to take advantage of this new device capability to enhance or augment navigation and route guidance. However, users are often not provided with the ability to automatically determine a vehicle lane position while using a vehicle during various road conditions.

Thus, a need still remains for a navigation system with a roadway lane guidance mechanism for operator awareness while using a navigation system. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a navigation system, including: a control unit; a communication unit, coupled to the control unit, configured to: determining a lane position on a current roadway for a free-drive mode; identifying a restricted use lane based on a distance and the lane position ahead on the current roadways; and determining a roadway lane along with the restricted use lane and the lane position for displaying on a device.

An embodiment of the present invention provides a method of operation of a navigation system including: determining a lane position on a current roadway for a free-drive mode; identifying a restricted use lane based on a distance and the lane position ahead on the current roadways; and determining a roadway lane along with the restricted use lane and the lane position for displaying on a device.

An embodiment of the present invention provides a non-transitory computer readable medium including instructions for execution including: determining a lane position on a current roadway for a free-drive mode; identifying a restricted use lane based on a distance and the lane position ahead on the current roadways; and determining a roadway lane along with the restricted use lane and the lane position for displaying on a device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
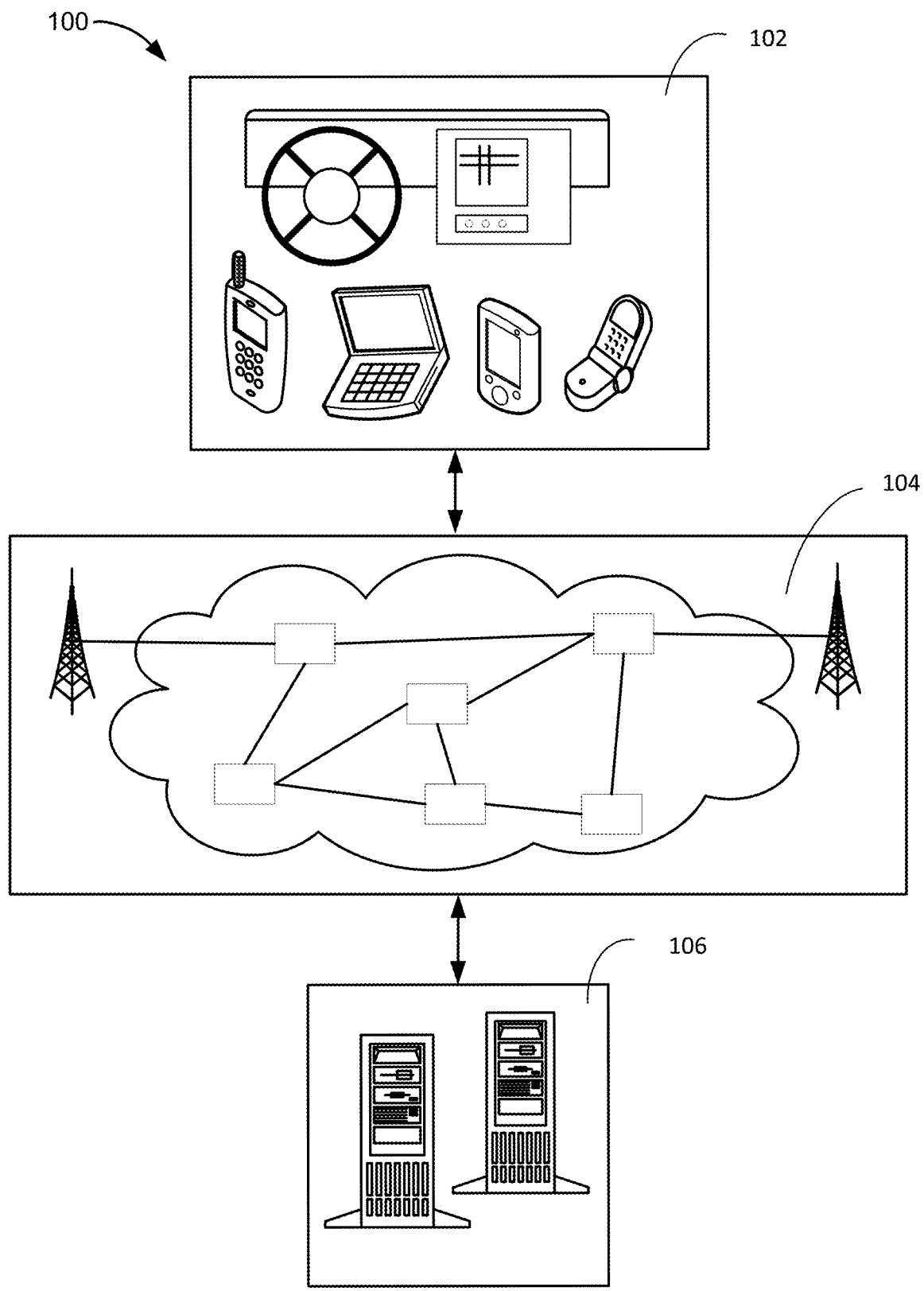
FIG. 1 is a navigation system with lane position guidance mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "module" referred to herein can include software, hardware, or a combination thereof in an embodiment of the present invention in accordance with the context in which the term is used. For example, the software can be machine code, firmware, embedded code, and application software. Also, for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include the specialized hardware circuitry for the purposes and the scope of apparatus claims.

The modules in the following description of the embodiments can be coupled to one other as described or as shown. The coupling can be direct or indirect without or with, respectively, intervening items between coupled items. The coupling can be physical contact or by communication between items.

Referring now to FIG. 1, therein is shown a navigation system 100 with lane position guidance mechanism in an embodiment of the present invention. The navigation system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of computing devices, such as a cellular phone, a tablet computer, a smart phone, a notebook computer, vehicle embedded navigation system, or computing device. The first device 102 can couple, either directly or indirectly, to the communication path 104 to communicate with the second device 106 or can be a stand-alone device.

The second device 106 can be any of a variety of centralized or decentralized computing devices, sensor devices to take measurements or record environmental information, such as sensor instruments, sensor equipment, or a sensor array. For example, the second device 106 can be a multimedia computer, a laptop computer, a desktop computer, grid-computing resources, a virtualized computer resource, cloud computing resource, routers, switches, peer-to-peer distributed computing devices, or a combination thereof.

The second device 106 can be mounted externally or internally to a vehicle, centralized in a single room or within a vehicle, distributed across different rooms, distributed across different geographical locations, embedded within a telecommunications network. The second device 106 can couple with the communication path 104 to communicate with the first device 102.

For illustrative purposes, the navigation system 100 is described with the second device 106 as a computing device, although it is understood that the second device 106 can be different types of devices, such as a standalone sensor or measurement device. Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
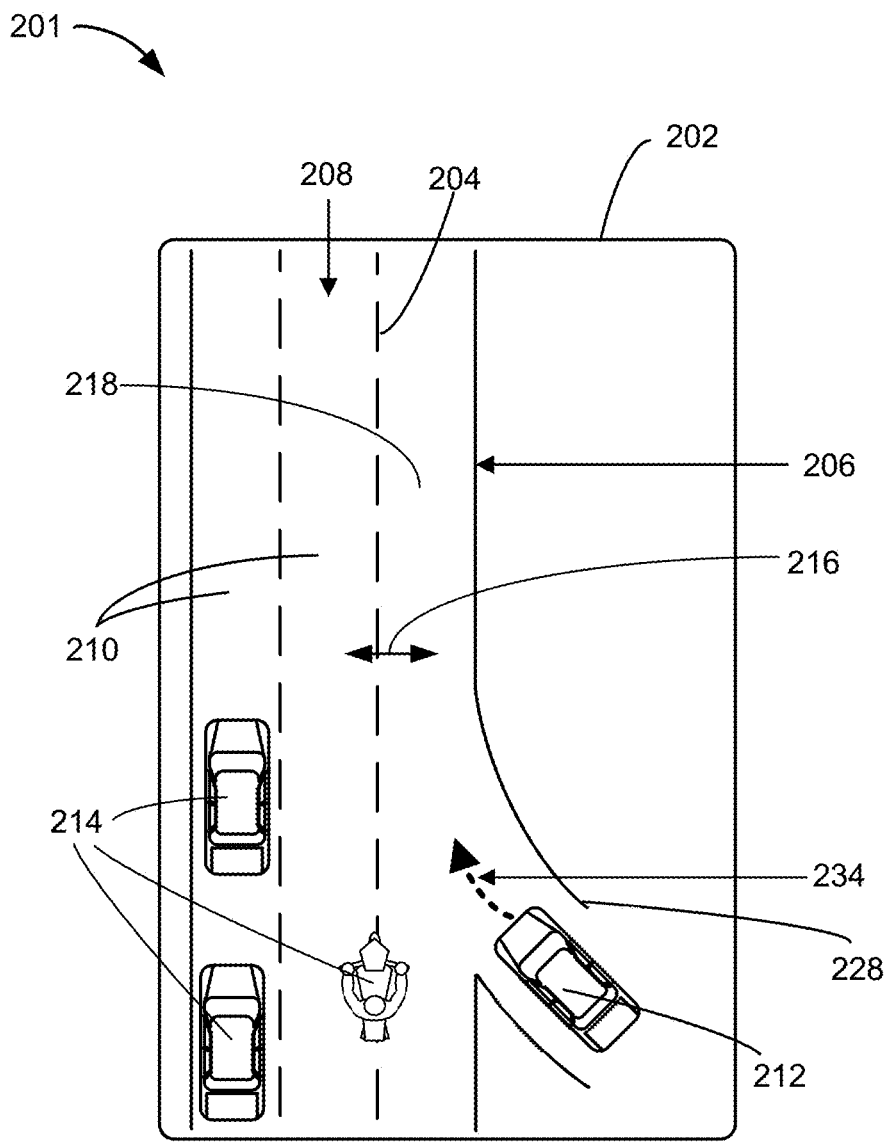
FIG. 2 is an example of a free-drive mode of the user vehicle of the navigation system.

Referring now to FIG. 2, therein is shown a representation of a road lane model 201 of the navigation system 100. The road lane model 201 is an estimation of the lanes on a current roadway. For example, the road lane model 201 can be localized to the geographic location around a user vehicle 212. The user vehicle 212 can be a vehicle occupied by the system user (not shown) of the first device 102, such as the occupant or operator of the user vehicle 212.

For example, the road lane model 201 can be a portion of a planned route 202 include a lane delineation marker 204 for roadway lanes 210 on a roadway relative to the location of a user vehicle 212. As an example, the road lane model 201 can be localized to include the lane delineation marker 204 for a current roadway 206. It is understood that the planned route 202 includes a starting point and a destination with the planned route between the two.

The road lane model 201 can include lane delineation marker 204 for roadway lanes 210 on a roadway relative to the location of a user vehicle 212. The lane delineation marker 204 are estimations or approximations of the roadway lanes 210 that divide vehicle traffic on the roadway. For example, the road lane model 201 can be localized to include the lane delineation marker 204 for the current roadway 206, which is the roadway on which the user vehicle 212 is currently travelling. For example, the current roadway 206 can be a street, an alleyway, a highway, a freeway, a parkway, a toll road, or unpaved path.

In general, the lane delineation marker 204 can correspond with the roadway lanes 210, which are the actual lane delineations on the current roadway 206. As an example, reference objects in the environment around the user vehicle 212 can be used as a basis for alignment for the lane delineation marker 204. The reference objects, for example, can include painted lane marking, raised pavement markers, reflective lane markers, traffic barriers, pylons, cones, flares, illuminators, other markings or features that indicate the existence of a traffic lane, or a combination thereof. As another example, the reference objects can include physical features of the roadway including gaps or edges between concrete or paved segments; metallic rails for trolleys or cable cars that embedded or integrated with the road way; changes in or transitions between the road surface such as from an asphalt, concrete, or paved surface to a gravel or unpaved surface which generally exist along the edge of a roadway; or a combination thereof.

The road lane model 201 can be used by the navigation system 100 to determine a lane position 208 of the user vehicle 212 on the current roadway 206. The lane position 208 identifies the roadway lanes 210 of the current roadway 206 in which the user vehicle 212 is located or entering.

In an implementation of the navigation system 100, the lane position 208 can be determined based on an initial point of entry of the user vehicle 212 onto the current roadway 206. For example, the lane position 208 can be based on a measurement of the number and direction of lateral shifts 216 in position along the current roadway 206 the user vehicle 212 has made since entry onto the current roadway 206.

For illustrative purposes, the initial point of entry is depicted as a lane merge section 228. The lane merge section 228 are sections of the current roadway 206 where two or more instances of the roadway lane 210 merge into a single instance of the roadway lane 210. As an example, the lane merge section 228 can include a highway on-ramp or off-ramp, an intersection with other roadways, instances or types of the current roadway 206, or an exit from a vehicle parking area. The lane merge section 228 can lead to a temporarily restricted lane 218. The temporarily restricted lane 218 can be a lane temporarily closed by a traffic accident, construction, an emergency vehicle, flooding, rock slide, snow, or a combination thereof.

In another implementation, the navigation system 100 can determine the lane position 208 of the user vehicle 212 based on information from a global navigation satellite system, global positioning system, cellular triangulation system, dead reckoning, or a combination thereof. Details for calculating the lane position 208 of the user vehicle 212 based on the road lane model 201 will be discussed below.

The navigation system 100 can include monitoring of proximately located vehicles 214. The proximately located vehicles 214 are vehicles within proximity to the user vehicle 212. For example, the proximately located vehicles 214 can be a vehicle that is within a specific range or distance of the user vehicle 212. An example of the specific range can be a predetermined value, such as within 100 or 1,000 feet, or a distance determined by the user or manufacturer of the user vehicle 212. In another example, the specific range or distance can be based on limitations of sensors used to detect the proximately located vehicles 214. Details regarding these features will be discussed below.

It has been discovered that the navigation system 100 can monitor the proximately located vehicles 214 in order to provide warnings and an initial point of entry 234. The navigation system 100 can help prevent accidents by maintaining awareness of the proximately located vehicles 214. The road lane model 201 can monitor the lateral shifts 216 of the user vehicle 212 in order to determine the lane position 208 of the user vehicle 212 on the current roadway 206. The counting of the lane change maneuvers can indicate which of the roadway lanes 210 in which the user vehicle 212 is operating. The lane position 208 can be based on a monitoring of the number and direction of lateral shifts 216 in position along the current roadway 206 the user vehicle 212 has made since entry onto the current roadway 206. By monitoring the proximately located vehicles 214 and the lane position 208 of the user vehicle 212, the navigation system 100 can provide safe navigation instructions. The navigation system 100 can improve traffic safety, reduce congestion, and assist in staying on an unplanned route by notifying the operator of the user vehicle 212 which lane position 208 they should be in to best prepare for the initial point of entry 234.

Figure 3:
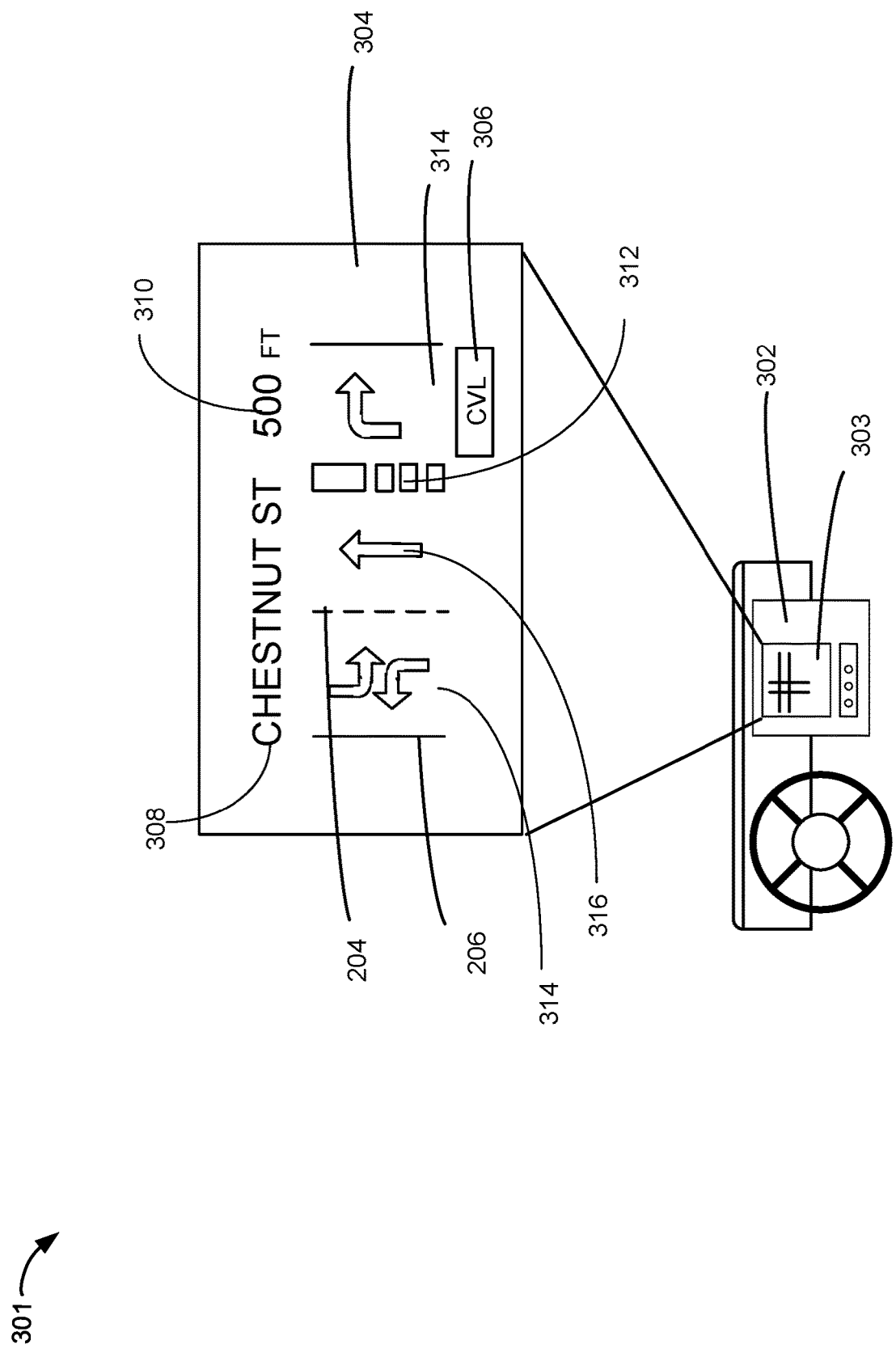
FIG. 3 is an example of the free-drive mode of the navigation system.

Referring now to FIG. 3, therein is shown an example of a free-drive mode 301 of the user vehicle 212 of the navigation system 100. The free-drive mode 301 can be a utilization of the user vehicle 212 without starting the planned route 202 of FIG. 2. such as a dashboard or center console interface, a vehicle integrated heads-up display, or a separate standalone device, such as a stand-alone heads-up display, mobile device, a navigation device, mobile phone, or mobile computing device.

In an implementation of the first device 102 that is integrated with the user vehicle 212, the system interface 302 can include a display interface 303, such as a heads-up display, a projector capable of projecting images on the windshield or windscreen of the user vehicle 212, an instrument panel with a touch screen, keypad, other interface components, or a combination thereof. For illustrative purposes, the user vehicle 212 is depicted by a graphical representation on the display interface 303.

The system interface 302 can project on a navigation interface 304 of the navigation system 100. The navigation interface 304 can include a heads-up display, center console display, a console stacked display, a free-standing display for providing a graphical representation of a geographical area. For example, the navigation interface 304 can depict the geographic area around the user vehicle 212. As a specific example, the navigation interface 304 can display a graphical representation of the current roadway 206, which is the roadway on which the user vehicle 212 is currently travelling, and number of the roadway lanes 210 for the current roadway 206. Examples of the current roadway 206 can be a street, an alleyway, a highway, a freeway, a parkway, a toll road, or unpaved path.

As another specific example, the navigation interface 304 can display graphical representation, a projection, or augmented reality superimposition of the lane delineations marker 204. The lane delineation marker 204 are estimations or approximations of the roadway lanes 210 that divide vehicle traffic on the current roadway 206. It is understood that the navigation interface 304 is a component of the first device 102 of FIG. 1 embodied as the user vehicle 212.

The navigation interface 304 is depicted projecting the free-drive mode 301. The open navigation session, also referred to as the free-drive mode 301, can occur when the system user (not shown) is using the navigation system 100 without the planned route 202. For example, the free-drive mode 301 can be when the system user is driving the user vehicle 212 with the map interface currently displaying on the navigation interface 304 of the first device 102 and the navigation system 100 is not engaged for providing navigation instructions or guidance, such as turn by turn directions, to a particular destination.

In general, during use of geographic map programs or navigation application used in the free-drive mode 301, system users are usually not provided any guidance or information about which of the roadway lanes 210 on the current roadway 206 to take or which of the roadway lanes 210 to avoid. For example, when the user vehicle 212 approaches an intersection between roadways while driving on the current roadway 206 that includes multiple instances of the roadway lanes 210, it is not easy to tell which of the roadway lanes 210 will become turn-only lanes, which of the roadway lanes 210 will go straight, which roadway lanes 210 might end, or a combination thereof.

As a specific example, the system user driving the user vehicle 212 can intend to proceed straight through the roadway intersection, but may be caught in the roadway lanes 210 with a turn-only restriction and will have to perform a lane change maneuver at the last minute, or end up making an unwanted turn maneuver. As another specific example, some of the roadway lanes 210 located in the middle or center of the roadway can also be used by vehicles traveling in both directions to make turn maneuvers, thus extra caution should be exercised when using such lanes so as to not run into oncoming vehicles. In yet a further example, there are certain instances of the roadway lanes 210 that are to be used for carpool or high occupancy vehicles (HOV), and driving in such lanes without the required number of passengers in the vehicle can result in a fine.

The navigation system 100 can address the potential issues with the roadway lanes 210 encountered during the free-drive mode 301 by presenting roadway lane indicator 306 on the navigation interface 304 as a "Smart Lane Advisor". The roadway lane indicator 306 is information about the lanes of a roadway. For example, the roadway lane indicator 306 can include information specific to an instance of the roadway lanes 210, such as lane markings that indicate allowed turn maneuvers, notification of roadway lanes 210 ending or merging, notification of a forced maneuver, such as a turn only, or vehicle type or capacity restrictions such as carpool or HOV lanes, toll lanes, bicycle lanes, bus only lanes. As another example, the roadway lane indicator 306 can include information about up-coming instance of an intersecting roadway or roadway junction with the current roadway 206, including an intersecting roadway identity 308 or roadway junction such as the name or number, a real time estimated distance 310 of the user vehicle 212 from the intersecting roadway or roadway junction, or other information.

The navigation interface 304 can include presentation of the roadway lane indicator 306. For example, the navigation interface 304 can include presentation of the roadway lane indicator 306 of the location of the roadway lanes 210 with the restriction for bicycle travel only. As another example, the navigation interface 304 can include presentation of the roadway lane indicator 306 for vehicle traffic flow, such as a representation of lane markings of the turn only lane restriction; an icon or symbol representing the lane with through traffic; an icon or symbol representing that the lane permits vehicles traveling in both directions of traffic such as for the purpose of turning. In a further example, the navigation interface 304 can include presentation of the roadway lane indicator 306 of the intersection information such as the name of the upcoming instance of the intersecting roadway, a representation of the distance to the upcoming intersecting roadway, or a combination thereof.

The navigation interface 304 can include presentation of the lane position 208 of the user vehicle 212 on the current roadway 206, or a combination thereof on the navigation interface 304. The lane position 208 identifies the roadway lanes 210 of the current roadway 206 in which the user vehicle 212 is located. For illustrative purposes, the lane position 208 is presented as a box labeled current vehicle lane (CVL) is the roadway lane indicator 306, however, it is understood that the lane position 208 can be represented differently. For example, the lane position 208 can be presented by a graphical representation of the user vehicle 212, or other graphical icon. As a further example, the navigation interface 304 can include presentation of the lane delineation marker 204 for each of the roadway lanes 210. The roadway lanes 210 can include a bicycle lane 312, a limited action lane 314, such as a turn only lane or a bi-directional turn lane, a through lane 316, or a combination thereof.

It has been discovered that the navigation system 100, while operating in the free drive mode can project the useful lane information for an approaching intersection or lane restriction. By projecting on the navigation interface 304, the limitations of the roadway lanes 210 can be verified before the user vehicle 212 reaches the intersection being approached. Since the navigation system 100 does not have a destination loaded, the navigation interface 304 can provide lane information for an approaching navigation possibility.

Figure 4:
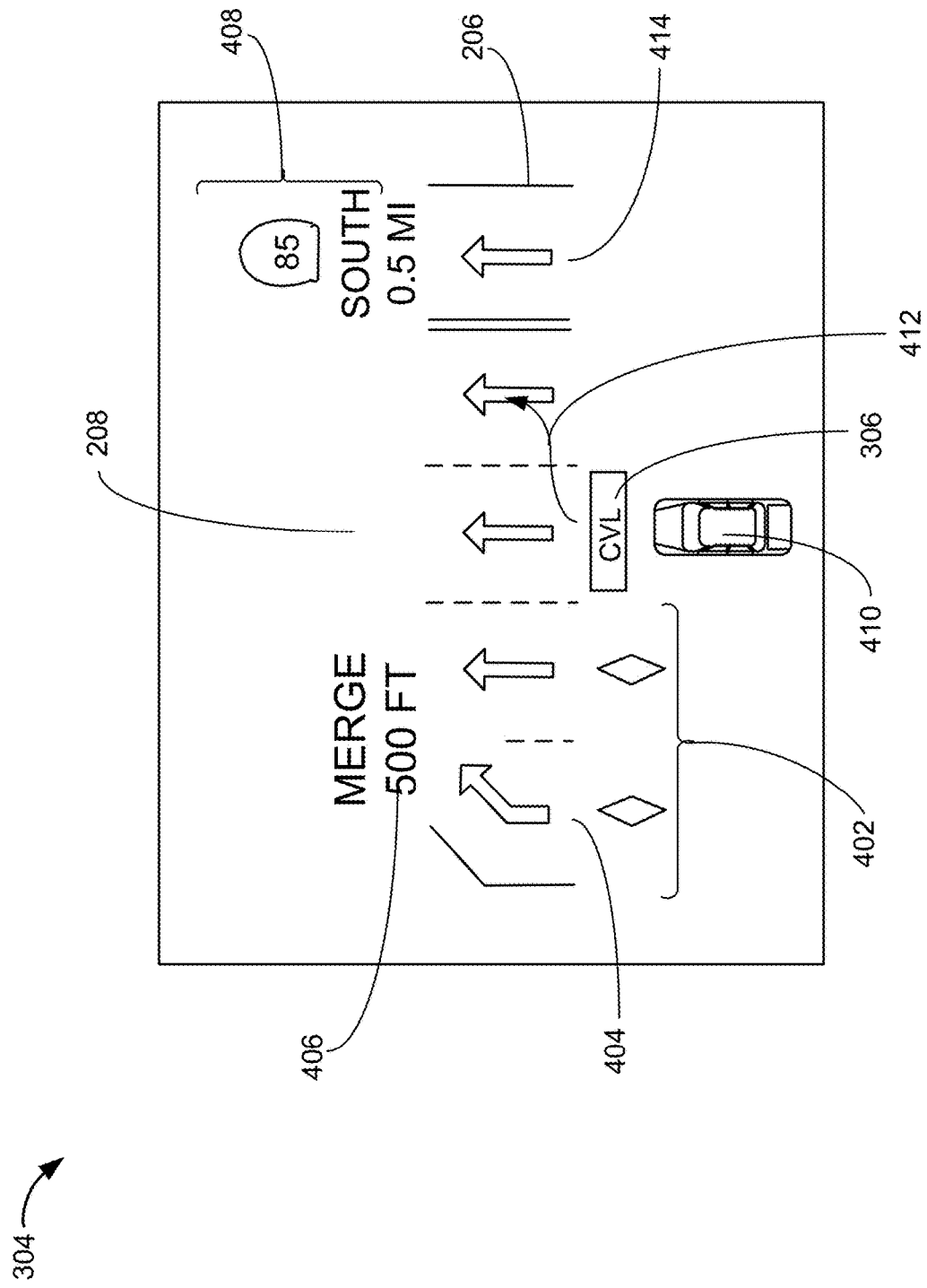
FIG. 4 is a further example of the free-drive mode of the navigation system.

Referring now to FIG. 4, therein is shown a further example of the free-drive mode 301 of the navigation system 100. As an example, FIG. 3 depicts the free-drive mode 301 including presentation of the roadway lane indicator 306 related to the current roadway 206 without cross-traffic roadways or an express highway, such as freeway, turnpikes, toll road, or parkway. As a specific example, the navigation interface 304 can include presentation of the roadway lane indicator 306 of the location in the roadway lanes 210 with restricted use lanes 402, such as for carpool, high occupancy vehicle lanes, exit lane, merging lane, or a combination thereof.

As another specific example, the navigation interface 304 can include presentation of the roadway lane indicator 306 for vehicle traffic flow, such as icon or symbol representing upcoming lane merges or lane endings 404, distance 406 to the lane merge or ending, or a combination thereof. In a further specific example, the navigation interface 304 can include presentation of the roadway lane indicator 306 of a next highway junction 408 such as the name or number of the upcoming highway, a representation of the distance 406 to the upcoming highway junction, the instance of the roadway lane 210 for the highway junction, or a combination thereof.

The navigation interface 304 can include presentation of the lane position 208 of the user vehicle 212 on the current roadway 206, or a combination thereof on the navigation interface 304. For illustrative purposes, the lane position 208 is presented as the roadway lane indicator 306, such as a box labeled current vehicle lane (CVL), however, it is understood that the lane position 208 can be represented differently. For example, the lane position can be presented by a graphical representation of the user vehicle 212, or other graphical icon. As a further example, the navigation interface 304 can include presentation of the lane delineation marker 204 for each of the roadway lanes 210.

In an emergency situation, the second device 106 of FIG. 1 can load an emergency message into the system interface 302 of FIG. 3 in order to alert the operator of the user vehicle 212 of an approaching emergency vehicle 410. The navigation interface 304 can display the approaching emergency vehicle 410 on the navigation interface 304. The navigation system 100 can issue the alert by displaying the approaching emergency vehicle 410 and issuing an audible instruction to change lanes 412 to the right and allow the approaching emergency vehicle 410 to pass. It is understood that the siren of the approaching emergency vehicle 410 cannot be heard in the user vehicle 212 that is a closed car. By providing the display of the approaching emergency vehicle 410 and issuing the audible alert can reduce the risk of an accident between the approaching emergency vehicle 410 and the user vehicle 212. In extreme situations the operator of the user vehicle 212 can be alerted to exit the current roadway 206 by an exit lane 414.

It has been discovered that the navigation interface 304 of the navigation system 100 can provide navigation support while driving without a destination loaded in the system. By way of an example, the "free driving mode" provides useful information to the operator of the user vehicle 212 when it is dark or during impaired visibility, such as during snow, rain, fog, or other impairments. The navigation interface 304 can provide emergency alerts of the approaching emergency vehicle 410 before the user vehicle 212 becomes an impediment to the approaching emergency vehicle 410. Thus, the navigation interface 304 can improve safety of the user vehicle 212, while enabling the operator of the user vehicle 212 to confidently navigate the current roadway 206 in reduced visibility situations.

Figure 5:
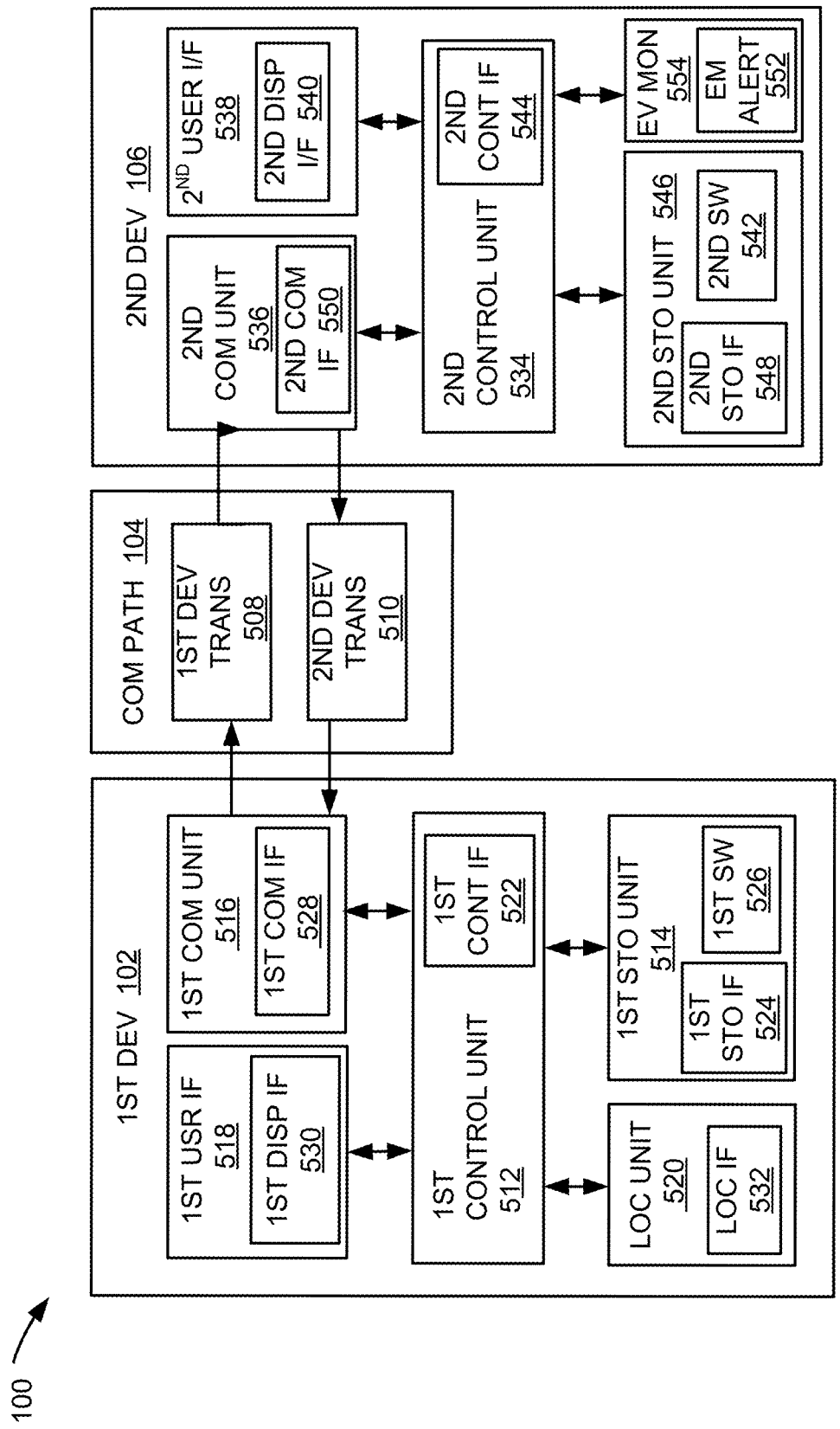
FIG. 5 is an exemplary block diagram of the navigation system.

Referring now to FIG. 5, therein is shown an exemplary block diagram of the navigation system 100. The navigation system 100 can include the first device 102, the communication path 104, and the second device 106. The first device 102 can send information in a first device transmission 508 over the communication path 104 to the second device 106. The second device 106 can send information in a second device transmission 510 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server having a display interface.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention. The first device 102 can be the user vehicle 212 of FIG. 2.

The first device 102 can include a first control unit 512, a first storage unit 514, a first communication unit 516, a first user interface 518, and location unit 520. The first control unit 512 can include a first control interface 522. The first control unit 512 can execute a first software 526 to provide the intelligence of the navigation system 100.

The first control unit 512 can be implemented in a number of different manners. For example, the first control unit 512 can be a processor, an application specific integrated circuit (ASIC) an embedded processor, a microprocessor, a hardware control logic, a hardware finite state machine (FSM), a digital signal processor (DSP), or a combination thereof. The first control interface 522 can be used for communication between the first control unit 512 and other functional units in the first device 102. The first control interface 522 can also be used for communication that is external to the first device 102.

The first control interface 522 can receive information from the other functional units or from external sources, or can transmit information to the other functional units or to external destinations. The external sources and the external destinations refer to sources and destinations external to the first device 102.

The first control interface 522 can be implemented in different ways and can include different implementations depending on which functional units or external units are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The location unit 520 can generate location information, current heading, and current speed of the first device 102, as examples. The location unit 520 can be implemented in many ways. For example, the location unit 520 can function as at least a part of a global positioning system (GPS) such as a GPS receiver, a global navigation satellite system (GNSS) receiver, an inertial navigation system, a cellular-tower location system, a pressure location system, or any combination thereof.

The location unit 520 can include a location interface 532. The location interface 532 can be used for communication between the location unit 520 and other functional units in the first device 102. The location interface 532 can also be used for communication that is external to the first device 102.

The location interface 532 can receive information from the other functional units or from external sources, or can transmit information to the other functional units or to external destinations. The external sources and the external destinations refer to sources and destinations physically separate from the first device 102.

The location interface 532 can include different implementations depending on which functional units or external units are being interfaced with the location unit 520. The location interface 532 can be implemented with technologies and techniques similar to the implementation of the first control interface 522.

The first storage unit 514 can store the first software 526. The first storage unit 514 can also store the relevant information. For example, first storage unit 514 can store information such as the map information.

The first storage unit 514 can be a volatile memory, a nonvolatile memory, an internal memory, an external memory, or a combination thereof. For example, the first storage unit 514 can be a nonvolatile storage such as non-volatile random access memory (NVRAM), Flash memory, disk storage, or a volatile storage such as static random access memory (SRAM).

The first storage unit 514 can include a first storage interface 524. The first storage interface 524 can be used for communication between and other functional units in the first device 102. The first storage interface 524 can also be used for communication that is external to the first device 102.

The first storage interface 524 can receive information from the other functional units or from external sources, or can transmit information to the other functional units or to external destinations. The external sources and the external destinations refer to sources and destinations external to the first device 102.

The first storage interface 524 can include different implementations depending on which functional units or external units are being interfaced with the first storage unit 514. The first storage interface 524 can be implemented with technologies and techniques similar to the implementation of the first control interface 522.

The first communication unit 516 can enable external communication to and from the first device 102. For example, the first communication unit 516 can permit the first device 102 to communicate with the second device 106 of FIG. 1, an attachment, such as a peripheral device or a computer desktop, and the communication path 104.

The first communication unit 516 can also function as a communication hub allowing the first device 102 to function as part of the communication path 104 and not limited to be an end point or terminal unit to the communication path 104. The first communication unit 516 can include active and passive components, such as microelectronics or an antenna, for interaction with the communication path 104.

The first communication unit 516 can include a first communication interface 528. The first communication interface 528 can be used for communication between the first communication unit 516 and other functional units in the first device 102. The first communication interface 528 can receive information from the other functional units or can transmit information to the other functional units.

The first communication interface 528 can include different implementations depending on which functional units are being interfaced with the first communication unit 516. The first communication interface 528 can be implemented with technologies and techniques similar to the implementation of the first control interface 522.

The first user interface 518 allows a user (not shown) to interface and interact with the first device 102. The first user interface 518 can include an input device and an output device. Examples of the input device of the first user interface 518 can include a keypad, a touchpad, soft-keys, a keyboard, a microphone, an infrared sensor for receiving remote signals, or any combination thereof to provide data and communication inputs.

The first user interface 518 can include a first display interface 530. The first display interface 530 can include a display, a projector, a video screen, a speaker, or any combination thereof.

The first control unit 512 can operate the first user interface 518 to display information generated by the navigation system 100. The first control unit 512 can also execute the first software 526 for the other functions of the navigation system 100. The first control unit 512 can further execute the first software 526 for interaction with the communication path 104 via the first communication unit 516.

The second device 106 can be optimized for implementing an embodiment of the present invention in a multiple device embodiment with the first device 102. The second device 106 can provide the additional or higher performance processing power compared to the first device 102. The second device 106 can include a second control unit 534, a second communication unit 536, and a second user interface 538.

The second user interface 538 allows a user (not shown) to interface and interact with the second device 106. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

The second control unit 534 can execute a second software 542 to provide the intelligence of the second device 106 of the navigation system 100. The second software 542 can operate in conjunction with the first software 526. The second control unit 534 can provide additional performance compared to the first control unit 512.

The second control unit 534 can operate the second user interface 538 to display information. The second control unit 534 can also execute the second software 542 for the other functions of the navigation system 100, including operating the second communication unit 536 to communicate with the first device 102 over the communication path 104.

The second control unit 534 can be implemented in a number of different manners. For example, the second control unit 534 can be a processor, an embedded processor, a microprocessor, hardware control logic, a hardware finite state machine (FSM), a digital signal processor (DSP), or a combination thereof.

The second control unit 534 can include a second controller interface 544. The second controller interface 544 can be used for communication between the second control unit 534 and other functional units in the second device 106. The second controller interface 544 can also be used for communication that is external to the second device 106.

The second controller interface 544 can receive information from the other functional units or from external sources, or can transmit information to the other functional units or to external destinations. The external sources and the external destinations refer to sources and destinations external to the second device 106.

The second controller interface 544 can be implemented in different ways and can include different implementations depending on which functional units or external units are being interfaced with the second controller interface 544. For example, the second controller interface 544 can be implemented with a pressure sensor, an inertial sensor, a microelectromechanical system (MEMS), optical circuitry, waveguides, wireless circuitry, wireline circuitry, or a combination thereof.

A second storage unit 546 can store the second software 542. The second storage unit 546 can also store map or mapping information. The second storage unit 546 can be sized to provide the additional storage capacity to supplement the first storage unit 514.

For illustrative purposes, the second storage unit 546 is shown as a single element, although it is understood that the second storage unit 546 can be a distribution of storage elements. Also for illustrative purposes, the navigation system 100 is shown with the second storage unit 546 as a single hierarchy storage system, although it is understood that the navigation system 100 can have the second storage unit 546 in a different configuration. For example, the second storage unit 546 can be formed with different storage technologies forming a memory hierarchal system including different levels of caching, main memory, rotating media, or off-line storage.

The second storage unit 546 can be a volatile memory, a nonvolatile memory, an internal memory, an external memory, or a combination thereof. For example, the second storage unit 546 can be a nonvolatile storage such as non-volatile random access memory (NVRAM), Flash memory, disk storage, or a volatile storage such as static random access memory (SRAM).

The second storage unit 546 can include a second storage interface 548. The second storage interface 548 can be used for communication between other functional units in the second device 106. The second storage interface 548 can also be used for communication that is external to the second device 106.

The second storage interface 548 can receive information from the other functional units or from external sources, or can transmit information to the other functional units or to external destinations. The external sources and the external destinations refer to sources and destinations external to the second device 106.

The second storage interface 548 can include different implementations depending on which functional units or external units are being interfaced with the second storage unit 546. The second storage interface 548 can be implemented with technologies and techniques similar to the implementation of the second controller interface 544.

The second communication unit 536 can enable external communication to and from the second device 106. For example, the second communication unit 536 can permit the second device 106 to communicate with the first device 102 over the communication path 104.

The second communication unit 536 can also function as a communication hub allowing the second device 106 to function as part of the communication path 104 and not limited to be an end point or terminal unit to the communication path 104. The second communication unit 536 can include active and passive components, such as microelectronics or an antenna, for interaction with the communication path 104.

The second communication unit 536 can include a second communication interface 550. The second communication interface 550 can be used for communication between the second communication unit 536 and other functional units in the second device 106. The second communication interface 550 can receive information from the other functional units or can transmit information to the other functional units.

The second communication interface 550 can include different implementations depending on which functional units are being interfaced with the second communication unit 536. The second communication interface 550 can be implemented with technologies and techniques similar to the implementation of the second controller interface 544.

The first communication unit 516 can couple with the communication path 104 to send information to the second device 106 in the first device transmission 508. The second device 106 can receive information in the second communication unit 536 from the first device transmission 508 of the communication path 104.

The second communication unit 536 can couple with the communication path 104 to send information to the first device 102 in the second device transmission 510. The first device 102 can receive information in the first communication unit 516 from the second device transmission 510 of the communication path 104. The navigation system 100 can be executed by the first control unit 512, the second control unit 534, or a combination thereof. For illustrative purposes, the second device 106 is shown with the partition having the second user interface 538, the second storage unit 546, the second control unit 534, and the second communication unit 536, although it is understood that the second device 106 can have a different partition. For example, the second software 542 can be partitioned differently such that some or all of its function can be in the second control unit 534 and the second communication unit 536. Also, the second device 106 can include other functional units not shown in FIG. 5 for clarity.

The second device 106 can provide emergency communication alerts by monitoring the route of the approaching emergency vehicle 410 of FIG. 4. The second device 106 can issue an emergency alert 552 by communicating with the first device 102 through the second device transmission 510. An emergency vehicle monitor 554 can keep track of the approaching emergency vehicle 410 of FIG. 4 operating in the vicinity of the user vehicle 212 of FIG. 2. The emergency vehicle monitor 554 can be a hardware interface that is communicatively coupled to the second control interface 544 for delivering the emergency alert 552 to the first device 102. It is understood that the emergency alert 552 can be delivered to the first device 102 in the form of a message that includes a visual portion and an audio portion of the emergency alert 552.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100.

Figure 6:
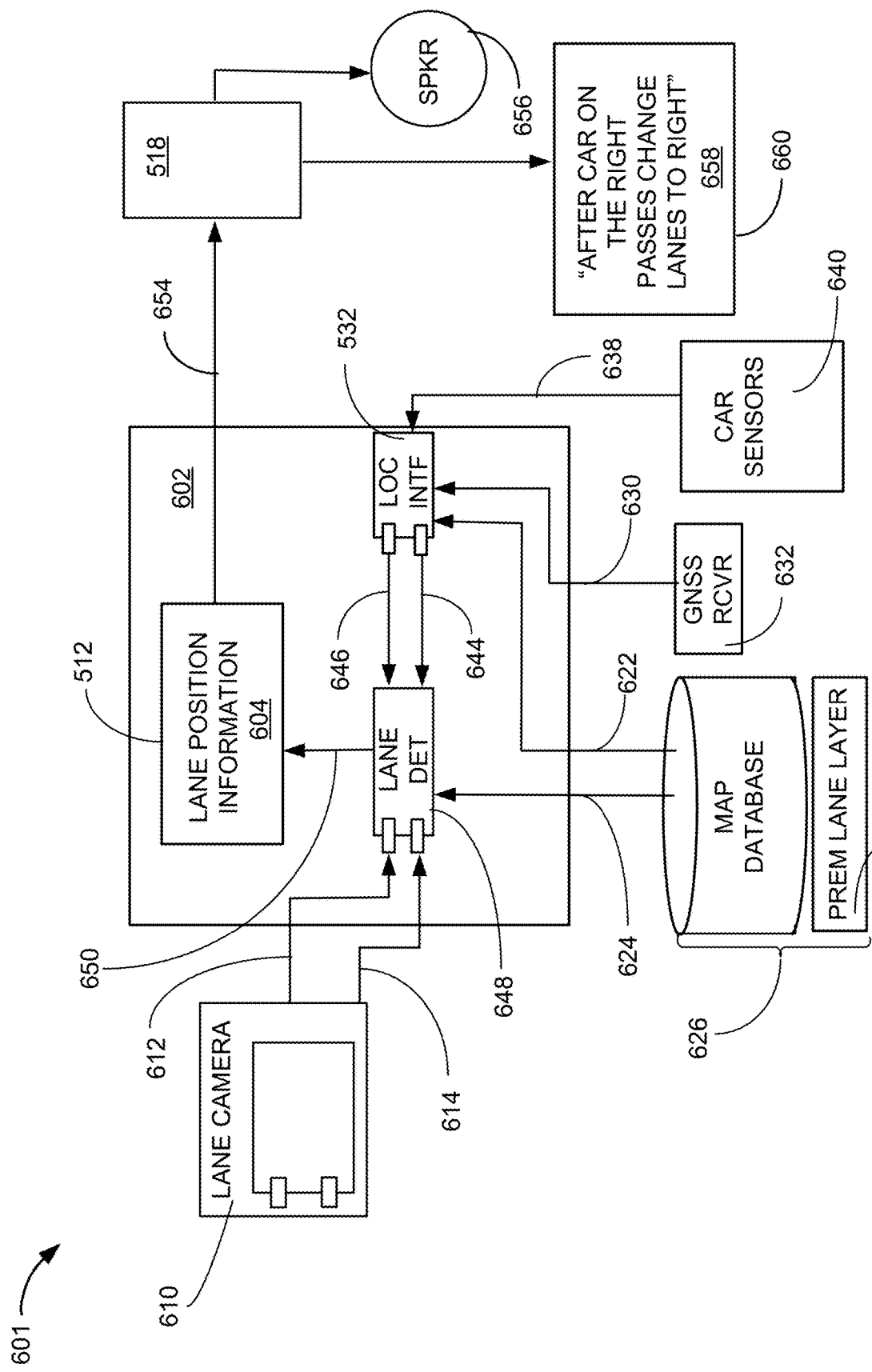
FIG. 6 is a further exemplary block diagram of the navigation system.

Referring now to FIG. 6, therein is shown a further exemplary hardware block diagram of a roadway lane guidance mechanism 601. As an example, the roadway lane guidance mechanism 601 can include a navigation processing module 602. The navigation processing module 602 is for generating the information about the lane position 208 of FIG. 2 of the user vehicle 212 of FIG. 2 on the current roadway 206 of FIG. 2 based on various sources of information.

For example, the navigation processing module 602 can generate lane position information 604, such as the total number of the roadway lanes 210 of FIG. 2 on the current roadway 206, the location of the lane delineation marker 204 of FIG. 2 for roadway lanes 210, the lane position 208 of the user vehicle 212 on the current roadway 206, or a combination thereof and associated confidence levels. The navigation processing module 602 can be a hardware structure configured to generate the lane position information 604 based on sensor information 638, user vehicle location information 630, map information 622, or a combination thereof. Details regarding generating the lane position information 604 will be discussed below.

The sensor information 638 can be information recorded or measured by a sensor unit 640, about the area or environment surrounding the user vehicle 212. The sensor information 638, can include various types of information regarding objects, such as the proximately located vehicles 214 of FIG. 2, surrounding the user vehicle 212 and can be provided in a number of different formats and states. The format of the sensor information 638 can be based on the source of the sensor information 638. For example, the state of the sensor information 638 can be raw or unprocessed information, such as raw signals or images, partially processed information, or processed information. More specifically, the sensor information 638 can be raw or unprocessed information or partially processed information sensor readings measured or recorded by sensor unit 640.

The sensor unit 640 can be a hardware device that includes sensors and detection instruments for monitoring the user vehicle 212 and the immediate surroundings. For example, the sensor unit 640 can include one or more instruments or sensors, such as a camera, a microphone, an infrared detector, a radar detector, a light detection and ranging (LIDAR) unit, an inertial measurement unit (IMU), or a combination thereof. The sensor unit 640 can include instruments and sensors attached to or integrated with the user vehicle 212 or external to the user vehicle 212, such as sensors or instruments mounted on the side of the current road 206. In an implementation, the sensor unit 640 can be a part of or coupled to the first device 102, the second device 106, or a combination thereof. As an example, the sensor unit 640 can include multiple instances of a sensor type integrated with or mounted at different locations in or on the user vehicle 212.

The user vehicle location information 630, which is the geographic or physical location of the user vehicle 212. For example, the user vehicle location information 630 can interface with the location unit 520 of FIG. 5 of the first device 102 to determine the user vehicle location information 630, such as a global positioning system (GPS) or a global navigation satellite system (GNSS) coordinates or the longitude and latitude of the user vehicle 212 provided by a GNSS receiver 632.

The map information 622 is information representing a geographic area proximate the user vehicle 212. For example, the map information 622 can correspond to the position of the user vehicle 212 and can include information about travel infrastructure, such as the current road 206 and highways; specific location information, such as building addresses; geographic features, such as terrain, bodies of water, and topography; or a combination thereof. As a specific example, the map information 622 can include lane information 624. The lane information 624 provides details about the current roadway 206.

For example, the lane information 624 can be information about the number and dimensions of the lane position 208 on the current road 206. The lane information 624 can include information, such as a count of the roadway lanes 210 for the current roadway 206, which is a count of the number of the roadway lanes 210, an estimated width of the roadway lanes 210, the existence and width of a road shoulder area, a total estimated width of the roadway, a speed limit, or a combination thereof. In another specific example, the map information 622 can include information of related roadways, such as intersections with the current roadway 206, including merge section 228 of FIG. 2 information such as the location and length of the lane merge section 228.

The map information 622 and the lane information 624 can be stored in a map database 626, which includes a premium lane layer 628, that can provide the information about the roadway lanes 210 in an area of interest around the user vehicle 212. The location interface 532 can receive the map information 622, the user vehicle location information 630, and the sensor information 638 in order to calculate a current position 644 and a current speed 646 of the user vehicle 212.

The location interface 532 can be a hardware device configured to identify the current position 644 and a current speed 646 of the user vehicle 212. The location interface 532 can be coupled to a lane determination module 648 that can receive the current position 644, the current speed 646 of the user vehicle 212, and the lane information 624 in order to identify which of the roadway lanes 210 in the current road 206 the user vehicle 212 is actually travelling in.

The lane determination module 648 can also receive input from a lane camera 610, which can identify the lane position 208, monitor lane markings, and identify the proximately located vehicles 214 or other obstructions. The lane camera 610 can be a hardware camera configured to provide visual reference for the lane position 208, the markings of the roadway lanes 210, and the proximately located vehicles 214. The lane determination module 648 can combine the lane information 624 with a visual detection stream 612 and a camera feed 614 in order to generate a lane information 650.

The lane determination module 648 can be coupled to the first control unit 512, which can receive the lane information 650 and process the lane position information 604. The first control unit 512 can be a hardware processor, analog circuitry, a sequential state machine, or digital application specific integrated circuit (ASIC), or the like. The first control unit 512 can transfer an announcement 654, composed from the lane position information 604, to the first display interface 518 for presentation to the operator of the user vehicle 212. The first display interface 518 can be coupled to a speaker 656 in order to deliver audio queues and a content 658, of the announcement 654, can be presented on a display screen 660. The roadway lane guidance mechanism 601 can manage the emergency alert 552 of FIG. 5 by referencing the proximately located vehicles 214, identifying the approaching emergency vehicle 410, modifying the content 658 to better inform the operator of the user vehicle 212 of the emergency alert 552.

It has been discovered that the roadway lane guidance mechanism 601 can look ahead for lane closures due to construction, accidents, natural disasters, or the like. The map database 626 can provide a framework of the number and details of the roadway lanes 210 that would normally be available for use. The navigation system 100, the first device 102 of FIG. 1, the second device 106 of FIG. 1, or a combination thereof can provide updates for the map database 626 for updating availability and changes in the roadway lanes 210, active traffic and closure information for the roadway lanes 210 as well as any activity of the approaching emergency vehicle 410 of FIG. 4. By providing a look-ahead display of the roadway lanes 210, the roadway lane guidance mechanism 601 can guide the user vehicle 212 in an efficient manner without being overly chatty with the audio announcements.

Figure 7:
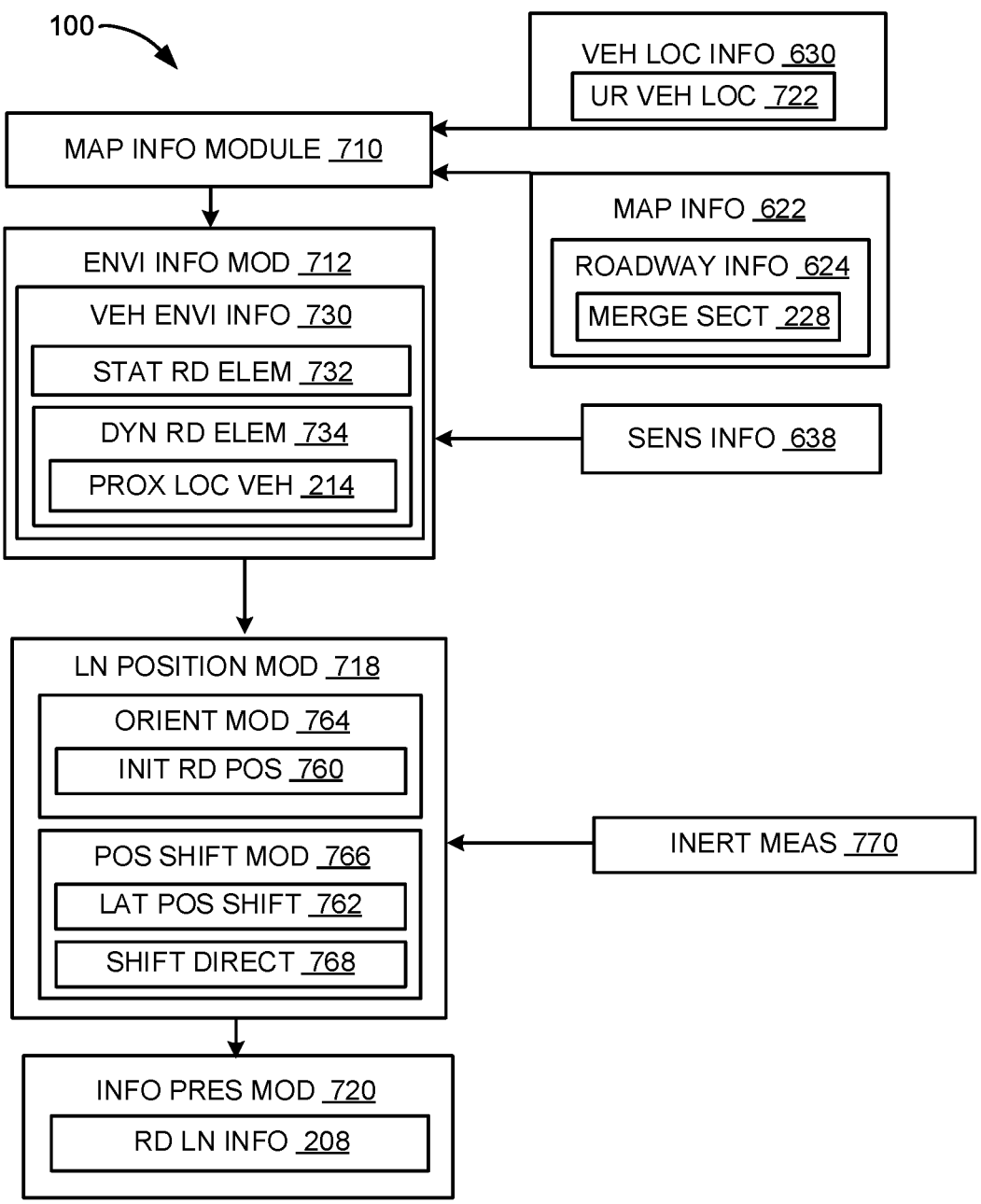
FIG. 7 is a control flow of the navigation system.

Referring now to FIG. 7, therein is a further exemplary control flow of the navigation system 100. As an example, the navigation system 100 can include a navigation processing module 602. The navigation processing module 602 is a hardware structure configured to generate the information about the lane position of the user vehicle on the current roadway based on various sources of information.

For example, the navigation processing module 602 can generate lane position information 604, such as the total number of the roadway lanes 210 on the current roadway 206, the location of the lane delineation marker 204 for roadway lanes 210, the lane position of the user vehicle 212 on the current roadway, or a combination thereof and associated confidence levels. The navigation processing module 602 can generate the lane position information 604 based on sensor information 638, user vehicle location information 626, map information 622, or a combination thereof. Details regarding generating the lane position information 604 will be discussed below.

The sensor information 638 can be information recorded or measured by sensors or instruments, such as the sensor unit 640, about the area or environment surrounding the user vehicle 212. The sensor information 638, can include various types of information regarding objects surrounding the user vehicle 212 and can be provided in a number of different formats and states. The format of the sensor information 638 can be based on the source of the sensor information 638. For example, the state of the sensor information 638 can be raw or unprocessed information, such as raw signals or images, partially processed information, or processed information. More specifically, the sensor information 638 can be raw or unprocessed information or partially processed information sensor readings measured or recorded by sensor units.

The sensor units can be a device that includes sensors and detection instruments. For example, the sensor unit can include one or more instruments or sensors, such as a camera, a microphone, an infrared detector, a radar detector, a LIDAR unit, an inertial measurement unit (IMU), or a combination thereof. The sensor units can include instruments and sensors attached to or integrated with the user vehicle 212 or external to the user vehicle 212, such as sensors or instruments mounted on the side of the road. In an implementation, the sensor units can be a part of or coupled to the first device 102, the second device 106, or a combination thereof. As an example, the sensor unit can include multiple instances of a sensor type integrated with or mounted at different locations in or on the user vehicle 212.

The user vehicle location information 630, which is the geographic or physical location of the user vehicle 212. For example, the user vehicle location information 630 can interface with the location unit 520 of FIG. 5 of the first device 102 to determine the user vehicle location 722, such as the GPS or GNSS coordinates or the longitude and latitude of the user vehicle 212.

The map information 622 is information representing a geographic area. For example, the map information 622 can correspond to the position of the user vehicle 212 and can include information about travel infrastructure, such as roads and highways; specific location information, such as building addresses; geographic features, such as terrain, bodies of water, and topography; or a combination thereof. As a specific example, the map information 622 can include roadway information 624.

The roadway information 624 is details about a particular roadway. For example, the roadway information 624 can be information about the current roadway 206 of FIG. 2. The roadway information 624 can include information, such as a lane count for the current roadway 206, which is a count of the number of lanes, an estimated width of the lanes, the existence and width of a road shoulder area, a total estimated width of the roadway, a speed limit, or a combination thereof. In another specific example, the map information 622 can include information of related roadways, such as intersections with the current roadway 206, including merge section information such as the location and length of the lane merge section 228 of FIG. 2. In a further example, the map information 622 can include the roadway lane indicator 306 of FIG. 3.

Referring now to FIG. 7, therein is shown a control flow of the navigation system 100. The control flow can be for determining the lane position 208 of the user vehicle 212.

The navigation system 100 can include a map information module 710, an environment information module 712, a lane position module 718, an information presentation module 720, or a combination thereof. The environment information module 712 can be coupled to the map information module 710. The lane position module 718 can be coupled to the environment information module 712. The information presentation module 720 can be coupled to the lane position module 718.

The map information module 710 is for processing the map information 622 corresponding to the position of the user vehicle 212 of FIG. 2. For example, the map information module 710 can utilize the user vehicle location information 630 to determine the map information 622. As a specific example, the map information module 710 can interface with the location unit 520 of FIG. 5 of the first device 102 to determine the user vehicle location information 630, such as the GPS coordinates or the longitude and latitude of the user vehicle 212. To continue the example, the map information module 710 can utilize the user vehicle location information 630 to get the map information 622 for the geographic area around the user vehicle 212.

The control flow can pass to the environment information module 712. The environment information module 712 is for collecting information about the environment around the user vehicle 212. For example, the environment information module 712 can process vehicle environment information 730, which is information regarding objects surrounding the user vehicle 212. For example, the vehicle environment information 730 can be information about a vehicle environment, which is the environment external to and surrounding the user vehicle 212, and can include information about static road elements 732, dynamic road elements 734, or a combination thereof.

The static road elements 732 are fixed objects at a static location within the environment around the user vehicle 212. For example, the static road elements 732 can be objects that are fixed or unlikely to change position over the passage of time. As a specific example, the static road elements 732 can be specific to the current roadway 206, such lane markings, sign posts, road barriers, pylons, trees, or buildings.

The dynamic road elements 734 are objects that change within the environment around user vehicle 212. The dynamic road elements 734 can be objects that are in motion or are temporary within the vehicle environment. For example, the dynamic road elements 734 can include the proximately located vehicles 214.

The environment information module 712 can collect the vehicle environment information 730 in a number of ways. In one implementation, the vehicle environment information 730 can be information received through communication or interfacing with the proximately located vehicles 214; information accumulated from the sensor information 638 or the sensor unit 640; information received from other sources external to the user vehicle 212 or the first device 102, such as a computer server or network; or a combination thereof. More specifically, the first control unit 512 can implement the first communication unit 516 with the environment information module 712 to communicate with devices external to the first device 102, such a communication unit of proximately located vehicles 214 or a traffic server, such as the second device 106.

In another implementation, the environment information module 712 can collect the vehicle environment information 730 as the sensor information 638. For example, the environment information module 712 can collect the vehicle environment information 730 by sending commands or requests to the sensor unit 640 to take various readings, which can be transmitted back to the environment information module 712 as the sensor information 638.

The map information module 710 can receive the map information 622 from various sources. For example, the map information module 710 can receive the map information 622 stored in the first storage unit 514 of FIG. 5 of the first device 102. In another example, the map information module 710 can receive the map information 622 from a device other than the first device 102, such as an external storage unit or server, the second storage unit 542 of FIG. 5, or a combination thereof. The map information 622 can include the roadway lane indicator 306.

The control flow can pass to the lane position module 718. The lane position module 718 is for calculating the lane position 208 of the user vehicle 212. In one implementation, the lane position module 718 can calculate the lane position 208 of the user vehicle 212 on the current roadway 206 based on an initial roadway position 760 and a lateral position shift 216 of the user vehicle 212. The lateral position shift 216 is a shift in position of the user vehicle 212 that is perpendicular to the axis of travel of the user vehicle 212.

The initial roadway position 760 is the initial location of the user vehicle 212 upon entry of the user vehicle 212 on the current roadway 206. For example, the initial roadway position 760 of the user vehicle 212 can be the user vehicle location information 630 of the user vehicle 212 upon entry of the user vehicle 212 onto the current roadway 206, such as after transitioning from an on-ramp, a street, or parking area onto the current roadway 206.

The lane position module 718 can determine the initial roadway position 760 of the user vehicle 212 with an orientation module 764. The orientation module 764 can determine the initial roadway position 760 based on the user vehicle location information 630, the map information 622, or a combination thereof. For example, the orientation module 764 can monitor the user vehicle location information 630 relative to the map information 622 to determine when the user vehicle 412 has transitioned on to the current roadway 206. To continue the example, the initial roadway position 760 can be determined over a post-transition distance following entry onto the current roadway 206, such as on the lane merge section 228. As a specific example, the post-transition distance can be a distance of 10 to 40 meters from the point of entry onto the current roadway 206, since vehicles tend to travel in the initial lane of entry over a short distance before engaging in further lane change maneuvers.

The orientation module 764 can determine the initial roadway position 760 based on the entry location to the current roadway 206. For example, the initial roadway position 760 can be on the right side of the current roadway 206 when the entry location is on the right side of the current roadway 206 and on the left side of the current roadway 206 when the entry location is on the left side of the current roadway 206.

The lane position module 718 can determine the lateral position shift 216 for the user vehicle 212 with the position shift module 766. The position shift module 766 can determine the lateral position shift 216 based on the force and duration of lateral movement corresponding to a distance of the lane width for the lane delineation marker 204 of the road lane model 201. As an example, the position shift module 766 can receive an inertial measurement 770 from inertial measurement unit to determine the lateral position shift 216.

The position shift module 766 can include a determination of a shift direction 768 associated with the lateral position shift 216. The shift direction 768 is the lateral direction in which the lateral position shift 216 occurred. As an example, the shift direction 768 can be based on the inertial measurement 770 from the inertial measurement unit.

The lane position module 718 can calculate the lane position 208 of the user vehicle 212 relative to the initial roadway position 760 of the user vehicle 212. For example, the lane position module 718 can calculate the lane position 208 relative to initial roadway position 760 according to the number of lateral position shift 216 and the associated shift direction 768. To continue the example, the lane position module 718 can correlate each instance of the lateral position shift 216 and associated shift direction 768 to the lane delineation marker 204 of the road lane model 201. In another example, in the case that the current roadway 206 includes a curve or bend, the lane position module 718 can determine the change in the lane position 208 according the lack of the lateral position shift 216 or a reduced amount of the lateral position shift 216, according to the degree of the curvature for the current roadway 206, relative to the degree of the lateral position shift 216 that would occur during the change in the lane position 208 on a straight section.

The control flow can pass to the information presentation module 720. The information presentation module 720 is for generating content displayed on the navigation interface 304 to present the roadway lane indicator 306 on the display screen 660 of FIG. 6. For example, the information presentation module 720 can generate the content displayed on the navigation interface 304 to present the roadway lane indicator 306 of the location of the roadway lanes 210 with the restriction for bicycle travel only. As another example, the information presentation module 720 can generate the content displayed on the navigation interface 304 to present the roadway lane indicator 306 for vehicle traffic flow, such as a representation of lane markings of the turn only lane bicycle lane 312; an icon or symbol representing the lane with through traffic lane 316; an icon or symbol representing that the lane permits vehicles traveling in both directions of traffic such as the limited action lane 314 for the purpose of turning. In a further example, the information presentation module 720 can generate the content displayed on the navigation interface 304 to present the roadway lane indicator 306 of the intersection information, such as the intersecting roadway identity 308, a representation of the distance 310 to the upcoming intersecting roadway, such as the distance 310, or a combination thereof.

In yet a further example, the information presentation module 720 can generate the content displayed on the navigation interface 304 to present the roadway lane indicator 306 related to the current roadway 206 without cross-traffic roadways or an express highway, such as freeway, turnpikes, toll road, or parkway. As a specific example, the information presentation module 720 can generate the content displayed on the navigation interface 304 to present the roadway lane indicator 306 of the location of the roadway lanes 210 with the restriction for carpool or high occupancy vehicle lanes, such as the restricted use lane 402. As another specific example, the information presentation module 720 can generate the content displayed on the navigation interface 304 to present the roadway lane indicator 306 for vehicle traffic flow, such as icon or symbol representing upcoming lane merges or lane endings, distance to the lane merge or ending, or a combination thereof. In a further specific example, the information presentation module 720 can generate the content displayed on the navigation interface 304 to present the roadway lane indicator 306 of highway junction information such the name or number of the next highway junction 408, a representation of the distance 406 to the upcoming highway junction, the instance of the roadway lane 210 for the highway junction, or a combination thereof.

The information presentation module 720 can generate the content displayed on the navigation interface 304 to present the lane position 208 of the user vehicle 212 on the current roadway 206, the lane delineation marker 204 for each of the roadway lanes 210, or a combination thereof. For example, the lane position 208 can be presented as a box labeled "current vehicle lane" 306, a graphical representation of the user vehicle 212, or other graphical icon, such as the proximately located vehicles 214, the approaching emergency vehicle 410, or a combination thereof.

It has been discovered that navigation system 100 with the Smart Lane Advisor improves operation of the user vehicle 212. The navigation system 100 can present the roadway lane indicator 306 on the system interface 304, such as a heads up display (HUD), instrument cluster, or center stack, which can help a system user operating the user vehicle 212 to decide which of the roadway lanes 210 to take when approaching the intersecting roadway or the roadway junction, which improves operation of the user vehicle 212. Further, providing the roadway lane indicator 306 on the system interface enables the system user to better decide which of the roadway lanes 210 are appropriate to use, which of the roadway lanes 210 to avoid, and which of the roadway lanes 210 are more advantageous at the roadway intersections without the need to have an explicit navigation route set.

The navigation system 100 has been described with module functions or order as an example. The navigation system 100 can partition the modules differently or order the modules differently. For example, the map information module 710 can be coupled to the information presentation module 720.

For illustrative purposes, the various modules have been described as being specific to the first device 102 or the second device 106. However, it is understood that the modules can be distributed differently. For example, the various modules can be implemented in a different device, or the functionalities of the modules can be distributed across multiple devices. Also, as an example, the various modules can be stored in a non-transitory memory medium.

As a more specific example, one or more modules described above can be stored in the non-transitory memory medium for distribution to a different system, a different device, a different user, or a combination thereof, for manufacturing, or a combination thereof. Also, as a more specific example, the modules described above can be implemented or stored using a single hardware unit, such as a chip or a processor, or across multiple hardware units.

The modules described in this application can be hardware implementation or hardware accelerators in the first control unit 512 of FIG. 5 or in the second control unit 534 of FIG. 5. The modules can also be hardware implementation or hardware accelerators within the first device 102 or the second device 106 but outside of the first control unit 512 or the second control unit 534, respectively, as depicted in FIG. 5. However, it is understood that the first control unit 512, the second control unit 534, or a combination thereof can collectively refer to all hardware accelerators for the modules.

The modules described in this application can be implemented as instructions stored on a non-transitory computer readable medium to be executed by a first control unit 512, the second control unit 534, or a combination thereof. The non-transitory computer medium can include the first storage unit 514 of FIG. 5, the second storage unit 546 of FIG. 5, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

The physical transformation from determining the lane position 208 of the user vehicle 212 results in the movement in the physical world, such as maneuvering the user vehicle 212 based on the roadway lane indicator 306. Movement in the physical world, such movement of the user vehicle 212, results in changes to the presentation of the navigation interface 304.

It has been discovered that the navigation system 100 can improve the free driving mode experience by showing the operator of the user vehicle 212 what to expect at the next intersection. The navigation interface 304 can display the roadway lanes 210 even during poor visibility events, such as rain, snow, fog, night, smoke, or a combination thereof. The navigation interface 304 can provide emergency guidance when the approaching emergency vehicle 410 is shown in the display 660 of FIG. 6. The speaker 656 of FIG. 6 can provide acoustic instructions for the user vehicle 212 to clear the lane position 208 and allow the approaching emergency vehicle to pass. This and other aspects of the navigation system 100 can improve the safety and efficiency of driving the user vehicle 212.

Figure 8:
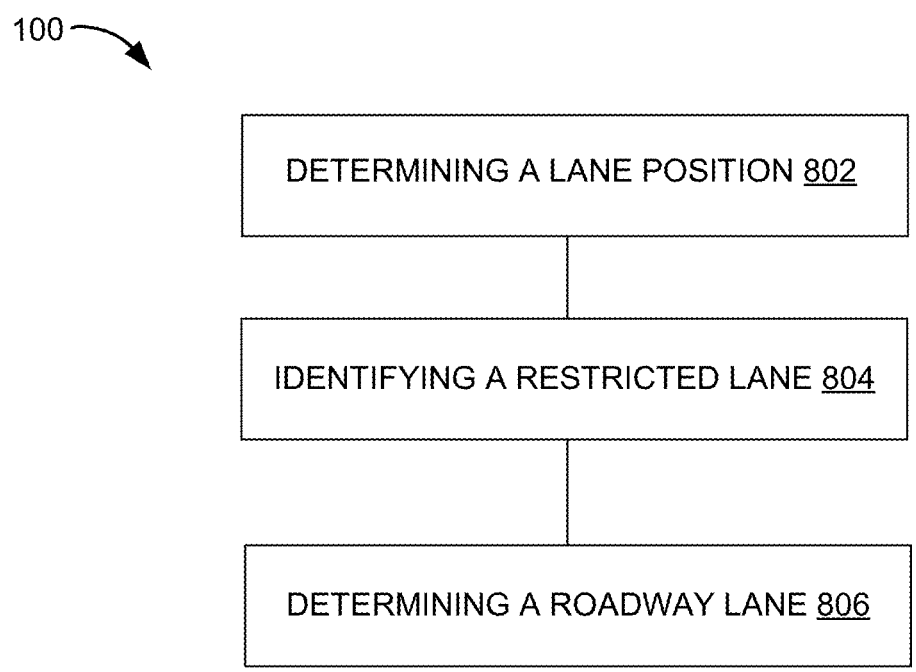
FIG. 8 is a flow chart of a method of operation of the navigation system in a further embodiment of the present invention.

Referring now to FIG. 8, therein is shown a flow chart of a method 800 of operation of the navigation system 100 in a further embodiment of the present invention. The flow chart of the method 800 includes: determining a lane position on a current roadway for a free-drive mode in a block 802; identifying a restricted use lane based on a distance and the lane position ahead on the current roadways in a block 804; and determining a roadway lane along with the restricted use lane and the lane position for displaying on a device in a block 806.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A navigation system comprising:
   a control unit;
      determine a lane position on a current roadway for a free-drive mode;
      identify a restricted use lane, based on a distance and the lane position, ahead on the current roadway;
      determine a roadway lane along with the restricted use lane and the lane position for the free-drive mode and without any guidance about which of the roadway lane on the current roadway to take or which of the roadway lane to avoid; and
   a communication unit, coupled to the control unit, configured to:
      communicate the roadway lane along with the restricted use lane and the lane position for displaying on a device.

2. The system as claimed in claim 1 wherein the control unit is further configured to identify a roadway lane indicator by monitoring a lateral shift of the device performing a lane change.

3. The system as claimed in claim 1 wherein the control unit is further configured to:
   monitor a temporary restricted lane including identifying an approaching emergency vehicle; and
   provide an announcement for a speaker and a display screen for alerting the device to perform a lane change to avoid the approaching emergency vehicle.

4. The system as claimed in claim 1 wherein the control unit is further configured to identify a proximately located vehicle on the current roadway by monitoring a lane camera to identify the proximately located vehicle.

5. The system as claimed in claim 1 wherein the control unit is further configured to communicate the roadway lane includes the roadway lane displayed on a display screen of the device.

6. The system as claimed in claim 1 wherein the control unit is further configured to identify the temporary restricted lane including identifying a lane position of an approaching emergency vehicle as the temporary restricted lane.

7. The system as claimed in claim 1 wherein the communication unit is further configured to communicate roadway lanes for a next highway junction for projecting a restricted use lane, a through lane, an exit lane, a bicycle lane, a distance to an intersecting roadway identity, or a combination thereof.

8. A method of operation of a navigation system comprising:
   determining a lane position on a current roadway for a free-drive mode;
   identifying a restricted use lane, based on a distance and the lane position, ahead on the current roadways;
   determining a roadway lane along with the restricted use lane and the lane position for the free-drive mode and without any guidance about which of the roadway lane on the current roadway to take or which of the roadway lane to avoid; and
   communicating the roadway lane along with the restricted use lane and the lane position for displaying on a device.

9. The method as claimed in claim 8 further comprising identifying a roadway lane indicator by monitoring a lateral shift of the device performing a lane change.

10. The method as claimed in claim 8 further comprising:
    monitoring a temporary restricted lane including identifying an approaching emergency vehicle; and
    providing an announcement for a speaker and a display screen for alerting the device to perform a lane change to avoid the approaching emergency vehicle.

11. The method as claimed in claim 8 further comprising identifying a proximately located vehicle on the current roadway includes monitoring a lane camera to identify the proximately located vehicle.

12. The method as claimed in claim 8 further comprising communicating the roadway lanes for displaying the roadway lanes on a display screen of the device.

13. The method as claimed in claim 8 wherein identifying a temporary restricted lane including identifying the lane position of an approaching emergency vehicle as the temporary restricted lane.

14. The method as claimed in claim 8 wherein the communication unit is further configured to communicate roadway lanes for a next highway junction for projecting the restricted use lane, a through lane, an exit lane, a bicycle lane, a distance to an intersecting roadway identity, or a combination thereof.

15. A non-transitory computer readable medium including instructions for execution, the instructions comprising:
    determining a lane position on a current roadway for a free-drive mode;
    identifying a restricted use lane, based on a distance and the lane position, ahead on the current roadways;
    determining a roadway lane along with the restricted use lane and the lane position for the free-drive mode and without any guidance about which of the roadway lane on the current roadway to take or which of the roadway lane to avoid; and
    communicating the roadway lane along with the restricted use lane and the lane position for displaying on a device.

16. The medium as claimed in claim 15 further comprising identifying a roadway lane indicator by monitoring a lateral shift of a first device performing a lane change.

17. The medium as claimed in claim 15 further comprising:
    monitoring a temporary restricted lane including identifying an approaching emergency vehicle; and
    providing an announcement for a speaker and a display screen for alerting the device to performing a lane change to avoid the approaching emergency vehicle.

18. The medium as claimed in claim 15 further comprising identifying a proximately located vehicle on the current roadway includes monitoring a lane camera to identify the proximately located vehicle.

19. The medium as claimed in claim 15 further comprising communicating the roadway lanes for displaying the roadway lanes on a display screen of the device.

20. The medium as claimed in claim 15 wherein the communication unit is further configured to communicate roadway lanes for a next highway junction for projecting the restricted use lane, a through lane, an exit lane, a bicycle lane, a distance to an intersecting roadway identity, or a combination thereof.

* * * * *